US010237424B2

(12) United States Patent
Sato

(10) Patent No.: US 10,237,424 B2
(45) Date of Patent: Mar. 19, 2019

(54) SYSTEM AND METHOD FOR ANALYZING, NOTIFYING, AND ROUTING DOCUMENTS

(71) Applicant: Tomoko Sato, San Francisco, CA (US)

(72) Inventor: Tomoko Sato, San Francisco, CA (US)

(73) Assignee: RICOH COMPANY, LTD., Tokyo (JP)

(*) Notice: Subject to any disclaimer, the term of this patent is extended or adjusted under 35 U.S.C. 154(b) by 314 days.

(21) Appl. No.: 15/044,941

(22) Filed: Feb. 16, 2016

(65) Prior Publication Data
US 2017/0237868 A1 Aug. 17, 2017

(51) Int. Cl.
G06F 17/00 (2006.01)
H04N 1/00 (2006.01)
G06K 9/00 (2006.01)

(52) U.S. Cl.
CPC ..... H04N 1/00228 (2013.01); G06K 9/00469 (2013.01); G06K 2209/01 (2013.01)

(58) Field of Classification Search
CPC .. G06F 17/30011; G06F 17/274; G06F 17/28; G06F 17/30017; G06F 2216/11; G06F 3/1204; G06F 3/1205
See application file for complete search history.

(56) References Cited

U.S. PATENT DOCUMENTS

| 6,104,500 | A | 8/2000 | Alam |
| 6,594,351 | B1 | 7/2003 | Bhogal |
| 6,842,263 | B1 | 1/2005 | Saeki |
| 6,850,908 | B1 | 2/2005 | Smith, II |
| 7,561,734 | B1 | 7/2009 | Wnek |
| 7,900,146 | B2 | 3/2011 | Kozuka |
| 2002/0138581 | A1 | 9/2002 | MacIntosh |
| 2003/0085162 | A1* | 5/2003 | Daniels, Jr. ............... B07C 3/14 209/584 |
| 2003/0120593 | A1 | 6/2003 | Bansal |
| 2004/0015552 | A1 | 1/2004 | Sugawara |
| 2004/0145769 | A1 | 7/2004 | Collier |
| 2005/0004885 | A1 | 1/2005 | Pandian |

(Continued)

FOREIGN PATENT DOCUMENTS

| JP | 11-317832 | 11/1999 |
| JP | 2008035245 | 2/2008 |

(Continued)

OTHER PUBLICATIONS

U.S. Appl. No. 14/738,504, filed Jun. 12, 2015, Office Action, dated Apr. 8, 2016.

(Continued)

Primary Examiner — Truong V Vo
(74) Attorney, Agent, or Firm — Hickman Palermo Becker Bingham LLP; Edward A. Becker

(57) ABSTRACT

An approach is provided for classifying and routing received documents. Text documents are received by a document classification service. The document classification service determines a classification types for documents based on a keyword-to-classification mapping. A document classification notification is send to a client device. The client device then confirms the document classification. Once confirmed, the document is sent to one or more destinations based on the classification of the document and a corresponding destination mapped to the classification.

20 Claims, 10 Drawing Sheets

(56) References Cited

U.S. PATENT DOCUMENTS

| | | |
|---|---|---|
| 2005/0209867 A1 | 9/2005 | Diesch |
| 2005/0210048 A1 | 9/2005 | Beres |
| 2006/0217959 A1 | 9/2006 | Saito |
| 2007/0150387 A1 | 6/2007 | Seubert |
| 2007/0168382 A1 | 7/2007 | Tillberg |
| 2007/0217715 A1 | 9/2007 | Newcomer |
| 2008/0123130 A1 | 5/2008 | Matsumoto |
| 2008/0147790 A1 | 6/2008 | Malaney |
| 2008/0239365 A1 | 10/2008 | Salgado |
| 2009/0138466 A1 | 5/2009 | Henry |
| 2009/0222490 A1 | 9/2009 | Kemp |
| 2009/0228777 A1 | 9/2009 | Henry |
| 2009/0296166 A1 | 12/2009 | Schrichte |
| 2010/0007916 A1 | 1/2010 | Ikeda |
| 2010/0046015 A1 | 2/2010 | Whittle |
| 2010/0067034 A1 | 3/2010 | Minamizono |
| 2010/0097634 A1 | 4/2010 | Meyers |
| 2010/0229246 A1 | 9/2010 | Warrington |
| 2010/0241603 A1 | 9/2010 | Voskuil |
| 2010/0245938 A1 | 9/2010 | Coley |
| 2010/0318538 A1 | 12/2010 | Wyman |
| 2012/0038948 A1 | 2/2012 | Park |
| 2012/0204103 A1 | 8/2012 | Stevens |
| 2013/0016405 A1 | 1/2013 | Tsutsumi |
| 2013/0254297 A1* | 9/2013 | Kobayashi ............ G06F 9/5044 709/205 |
| 2014/0153019 A1 | 6/2014 | Kida |
| 2014/0293361 A1 | 10/2014 | Mori |
| 2015/0278699 A1 | 10/2015 | Danielsson |
| 2016/0049010 A1 | 2/2016 | Hinski |
| 2016/0122148 A1 | 5/2016 | Westcott |
| 2016/0125680 A1 | 5/2016 | White |
| 2016/0366299 A1 | 12/2016 | Sato |
| 2017/0103230 A1 | 4/2017 | O'Brien |
| 2017/0142274 A1 | 5/2017 | Koyanagi |
| 2017/0220535 A1 | 8/2017 | Olsen |
| 2017/0300821 A1 | 10/2017 | Hong et al. |

FOREIGN PATENT DOCUMENTS

| | | |
|---|---|---|
| JP | 2008252544 | 10/2008 |
| JP | 2013121114 | 6/2013 |
| JP | 2013-255026 | 12/2013 |

OTHER PUBLICATIONS

Sato, U.S Appl. No. 14/738,504, filed Jun. 12, 2015, Office Action, dated May 4, 2017.

Hong, U.S. Appl. No. 15/132,064, filed Apr. 18, 2016, Office Action, dated Oct. 5, 2017.

U.S. Appl. No. 14/738,504, filed Jun. 12, 2015, Final Office Action, dated Sep. 12, 2016.

U.S. Appl. No. 14/738,504, filed Jun. 12, 2015, Interview Summary, dated Jun. 24, 2016.

Hong, U.S. Appl. No. 15/132,064, filed Apr. 18, 2016, Office Action, dated Oct. 2, 2018.

* cited by examiner

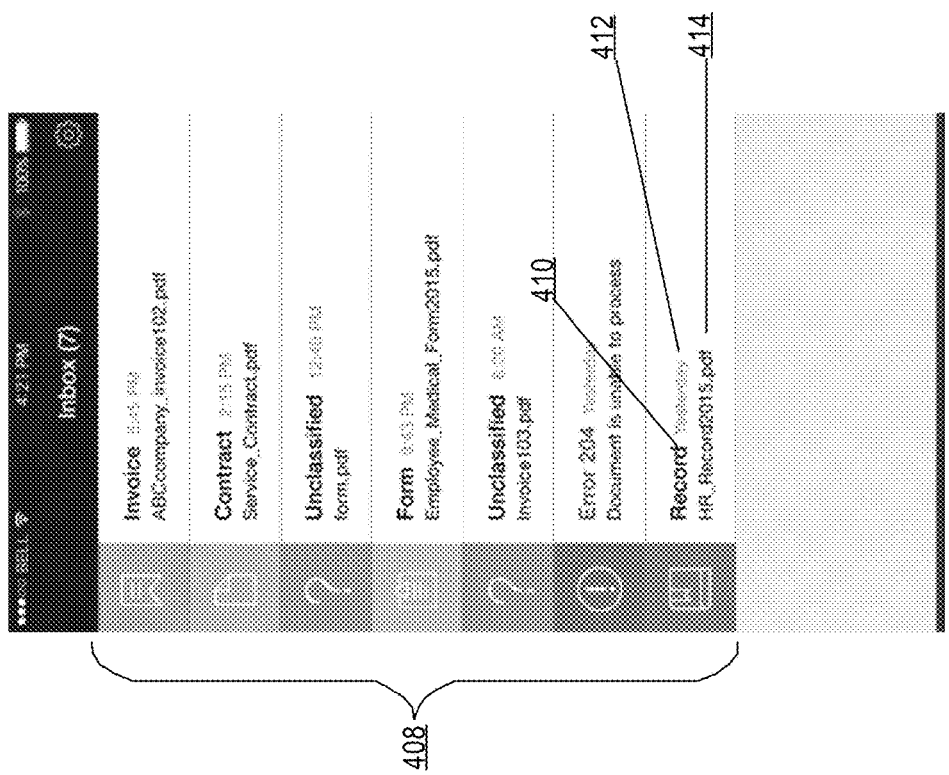

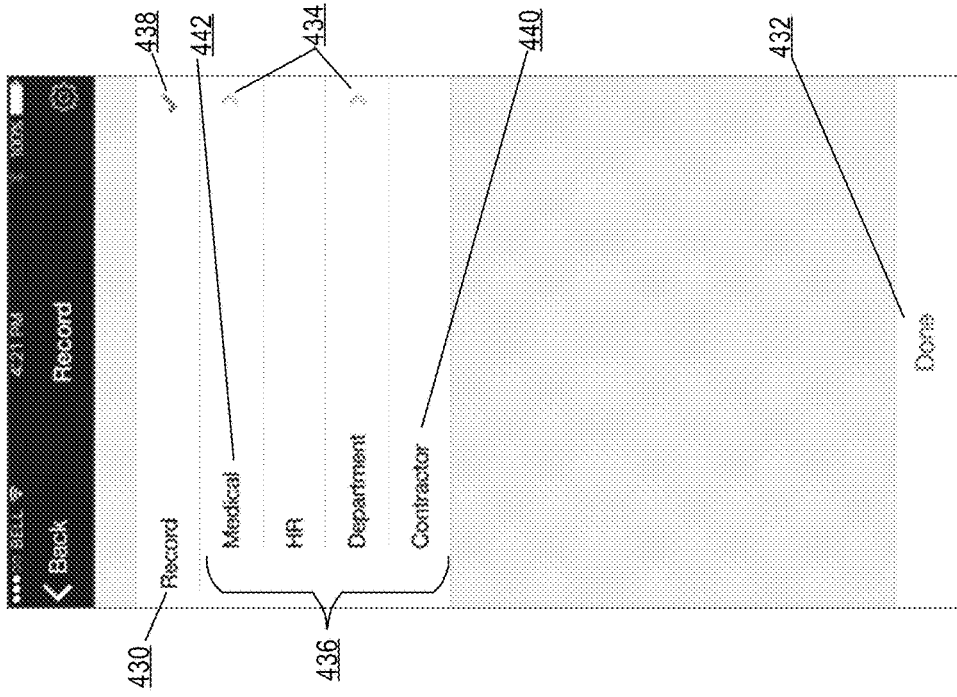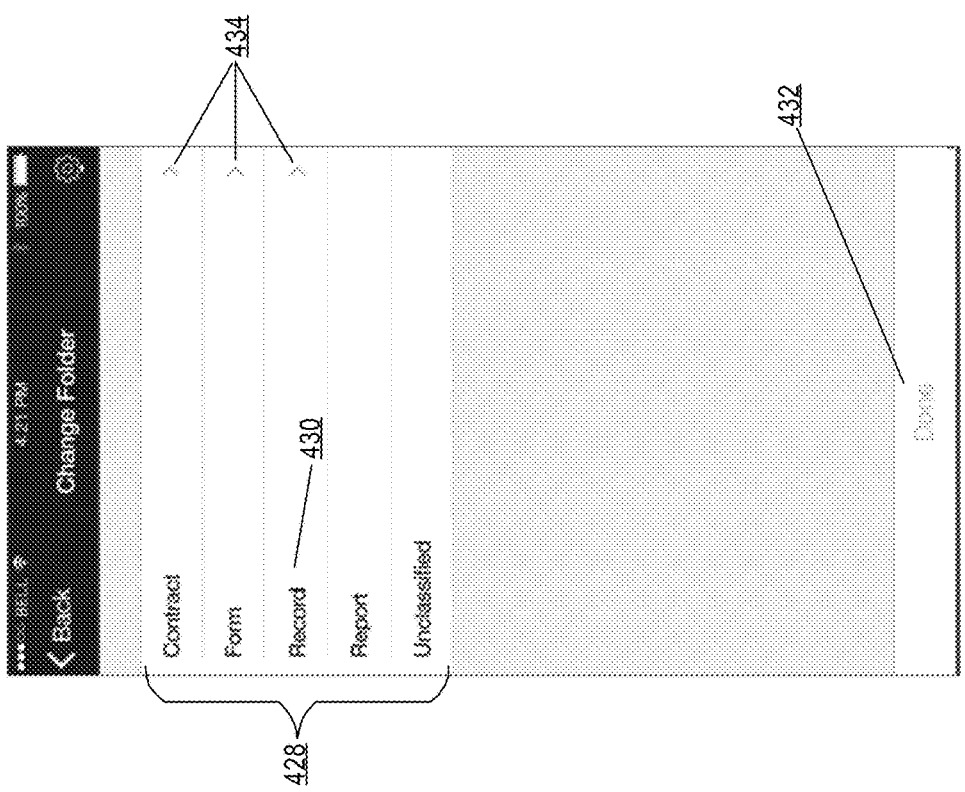

SYSTEM AND METHOD FOR ANALYZING, NOTIFYING, AND ROUTING DOCUMENTS

FIELD OF THE DISCLOSURE

The present disclosure relates to notifying and routing documents based on OCR data and a mapping between keywords and document classifications.

BACKGROUND

Document routing is currently an inefficient process. Documents received through facsimile tend to be either printed out at the facsimile device or generally stored in a data repository. Such a system is cumbersome for companies that receive a large number of facsimiles each day, often directed towards different portions of the company. In the case of a scan operation, a user may not always know the correct destination for each document. Additionally, in the case of a large number of documents, it may be inefficient for a user to manually select each destination for each document.

Generally, document routing systems are useful for digitally sending documents to the correct destinations. For example, some document routing systems use bar codes or QR codes to route documents. The codes are stored in a data repository and mapped to specific users. When a form with such a code is scanned, the code is detected and the document is sent to the correct location. The problem with a code-based system is that it requires the use of pre-printed forms. Often, companies that receive large numbers of facsimiles or that require large numbers of document scans are not in control of the form they receive. Additionally, if scanned documents are routed to the incorrect destination, the user is forced to manually track down the misrouted document in order to correct the problem.

SUMMARY

Techniques are provided for notifying a user of routing destinations for documents based on information retrieved from the documents. In an embodiment, a device receives a document image through either facsimile or scanning operations. An Optical Character Recognition (OCR) process is used to create text from the document. A document analytics service receives the OCR data relating to the electronic documents. Based on the OCR data, the document analytics service determines one or more classifications and corresponding destinations for the document. In an embodiment, the document analytics service sends classification data to a client device for a user to confirm or change. Once confirmed by the client device, the document analytics service stores the document at the destination associated with the confirmed classification for the document.

The document analytics service may use matching techniques to determine the one or more classifications. In an embodiment, the document analytics service accesses a keyword mapping which maps a specific combination of keywords to specific classifications. The document analytics service may search the OCR data for any of the keywords of the keyword mapping. The one or more classifications determined by the document analytics service may correspond to keywords found in the OCR data.

BRIEF DESCRIPTION OF THE DRAWINGS

In the figures of the accompanying drawings like reference numerals refer to similar elements.

FIGS. 4A-4J depict example graphical user interfaces for providing feedback related to document classification and document routing.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various embodiments are described hereinafter in the following sections:

1. GENERAL OVERVIEW
2. STRUCTURAL OVERVIEW
3. IMAGE CAPTURE AND OCR
4. DOCUMENT ANALYTICS
4.1. CLASSIFICATION MAPPING
4.2. ROUTING DETERMINATION
4.3. TRANSMITTING CLASSIFICATION DATA
5. STORING ELECTRONIC DOCUMENTS
6. SMART FEEDBACK APPLICATION
6.1. USER CONFIRMATION
6.2. USER CHANGE REQUEST
6.3. USER DELETE REQUEST
6.4. USER TRAIN REQUEST
6.5. DOCUMENT ERROR
7. MACHINE LEARNING
8. IMPLEMENTATION MECHANISMS

1. General Overview

An approach is provided for routing documents based on OCR data and document classification. In an embodiment, an image capture device receives a document, such as through an image capture or facsimile. An optical character recognition (OCR) process is used to transform the image of the document into OCR data. The OCR data is then searched for one or more specified keywords that correspond to document classification types in a keyword-to-classification mapping. A document classification notification is send to a client device. The client device then confirms the document classification. Once confirmed, the document is sent to one or more destinations based on the classification of the document and a corresponding destination mapped to the classification.

2. Structural Overview

Figure 1:
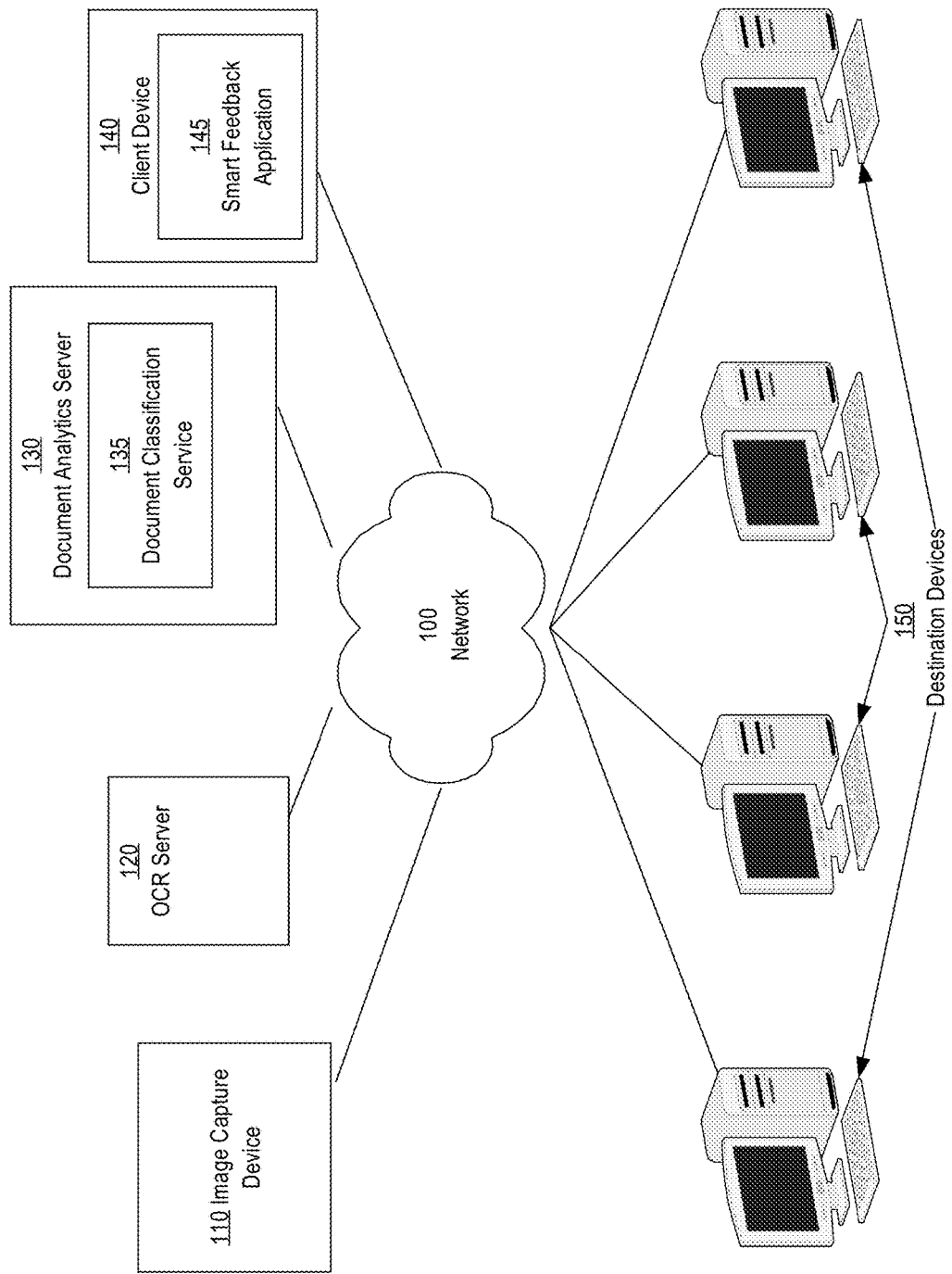
FIG. 1 depicts an example system architecture for routing documents to various devices using a document classification.

FIG. 1 depicts an example system architecture for routing documents to various devices using document classification. The example system architecture includes image capture device 110, OCR server 120, document analytics server 130, document classification service 135, client device 140, smart feedback application 145, and destination devices 150, communicatively coupled via network 100. Network 100 may be implemented by any medium or mechanism that provides for the exchange of data between the various elements of FIG. 1. Examples of network 100 include, but are not limited to, one or more networks, such as one or more Local Area Networks (LANs), one or more Wide Area Networks (WANs), one or more Ethernets or the Internet, or one or more terrestrial, satellite or wireless links. The various elements of FIG. 1 may also have direct (wired or wireless) communications links, depending upon a particular implementation.

In an embodiment, the image capture device 110, OCR server 120, document analytics server 130, document classification service 135, client device 140, smart feedback application 145, and destination devices 150 may be combined into fewer devices. For example, image capture device 110 may be configured to provide the OCR functions of OCR server 120, the document analytics functions of document analytics server 130, the verification functions of client device 140, or any combination thereof. As an alternate example, image capture device 110 may be limited to image capture and receipt, but a single server may perform the functions of OCR server 120 and document analytics server 130.

The image capture device 102 may be a device configured or programmed to perform one or more functions, such as printing, copying, facsimile, and document scanning. As one example, image capture device 110 may be a scanner. As another example, image capture device 110 may be a multi-function peripheral configured to perform the functions described herein. In some embodiments, image capture device 110 also contains one or more of digitally programmed logic configured to provide OCR functions, digitally programmed logic configured to provide document analytics functions, a classification mapping database configured to store keywords combinations mapped to classification types, a destination mapping database configured to store classification types mapped to destinations, a notification component configured to send classification data to one or more external devices, and a communications component configured to send and receive documents and other data to OCR server 120, document analytics server 130, client device 140, and destination devices 150.

The OCR server 120 may be configured or programmed to receive documents and perform OCR functions on the documents to create OCR data. The OCR data may include text data and may be in a wide variety of formats, for example, basic or rich text formats or formats supported by application programs and word processing applications. The OCR functions may include a wide variety of functions that may vary depending upon a particular implementation and embodiments are not limited to any particular OCR functions or OCR implementation. For example, a matrix matching algorithm may be used to compare pixels in the image data with pixels of letters in various fonts stored in a data structure on OCR server 120. Alternatively or additionally, a feature extraction algorithm may be used to compare features in the image data with features of characters in various fonts stored in the data structure on OCR server 120. The OCR server 120 may be configured to return the OCR data to the image capture device 110 or to send the OCR data to the document analytics server 130.

The document analytics server 130 may be configured or programmed to receive OCR data over a network and perform document analytics functions on the OCR data. Document analytics server 130 may also include the document classification service 135 that is configured to determine, based upon identified keywords from the OCR data, a classification type for electronic documents. In an embodiment, the document classification service 135 may be configured to implement or access a classification mapping database. The classification mapping database may be configured to store keyword combinations that map to classification types. In an embodiment, the classification mapping database may store mapping of classification types to destinations.

In an embodiment, the document classification service 135 may be further configured to send data to and receive data from the image capture device 110, the client device 140, and destination devices 150. In another embodiment, the document analytics server 130 may be configured to send data to and receive data from the image capture device 110, the client device 140, and destination devices 150 using a service separate from the document classification service 135. In some embodiments, the document classification service 135 contains a machine learning tool comprising digitally programmed logic, configured to perform pattern matching and document analytics based on prior matches and mismatches. Document classification service 135 may be implemented by computer hardware, computer software, or any combination of computer-hardware and software.

The client device 140 may be any computing device capable of interacting over a network with document analytics server 130 or image capture device 110. For example, the client device 140 may be a smart phone, a personal computer, a tablet computing device, a PDA, a laptop, or any other computing device capable of transmitting and receiving information and performing the functions described herein.

In an embodiment, the client device 140 is configured with a smart feedback application 145. The smart feedback application 145 is configured to receive notifications from the document classification service 135 and send user inputs to the document classification service 135. User inputs include, but are not limited to, user confirmation, user change requests, user delete requests, and user train requests.

Figure 2:
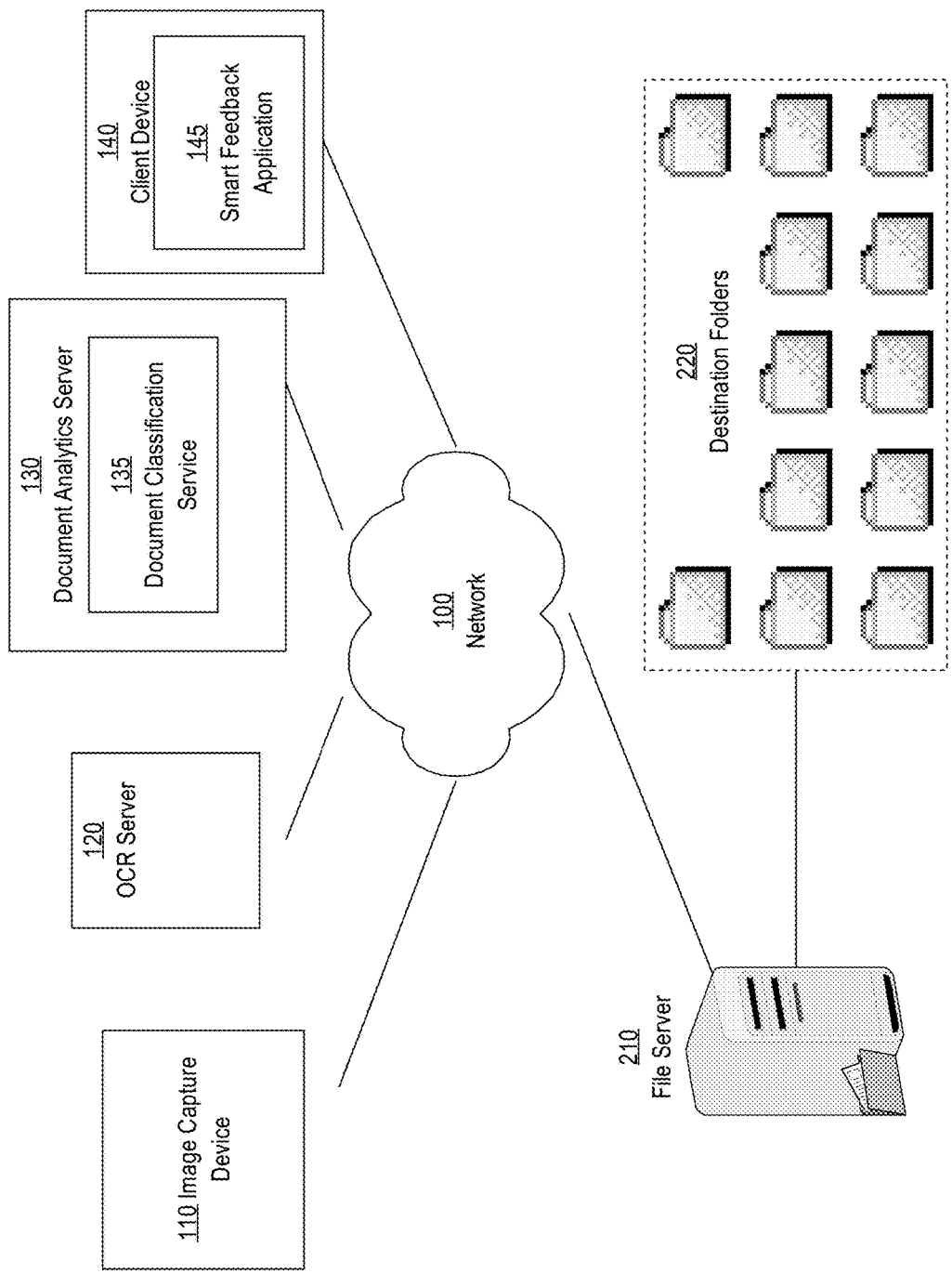
FIG. 2 depicts an example system architecture for routing documents to various destinations within a single device using a document classification.

FIG. 2 depicts an example system architecture for routing documents to various devices using document classification. FIG. 2 contains image capture device 110, OCR server 120, document analytics server 130, document classification service 135, client device 140, smart feedback application 145, and file server 210 with destination folders 220 communicatively coupled over network 100. File server 210 may be a central data repository configured to store a plurality of documents. Data within file server 210 may be subdivided into destination folders 220. Destination folders 220 represent various storage destinations within file server 210 and are not limited to folder structures per se. Additionally, embodiments of file server 210 include, but are not limited to, cloud file server systems, enterprise content management systems, distributed file servers, or any other storage management system configured to maintain files and folders. In various embodiments, combinations of FIG. 1 and FIG. 2 may comprise a system architecture for the routing system and methods described herein. For example, documents may be routed between multiple devices where one or more of the devices contain a plurality of destinations within the one or more devices.

3. Image Capture and OCR

Figure 3:
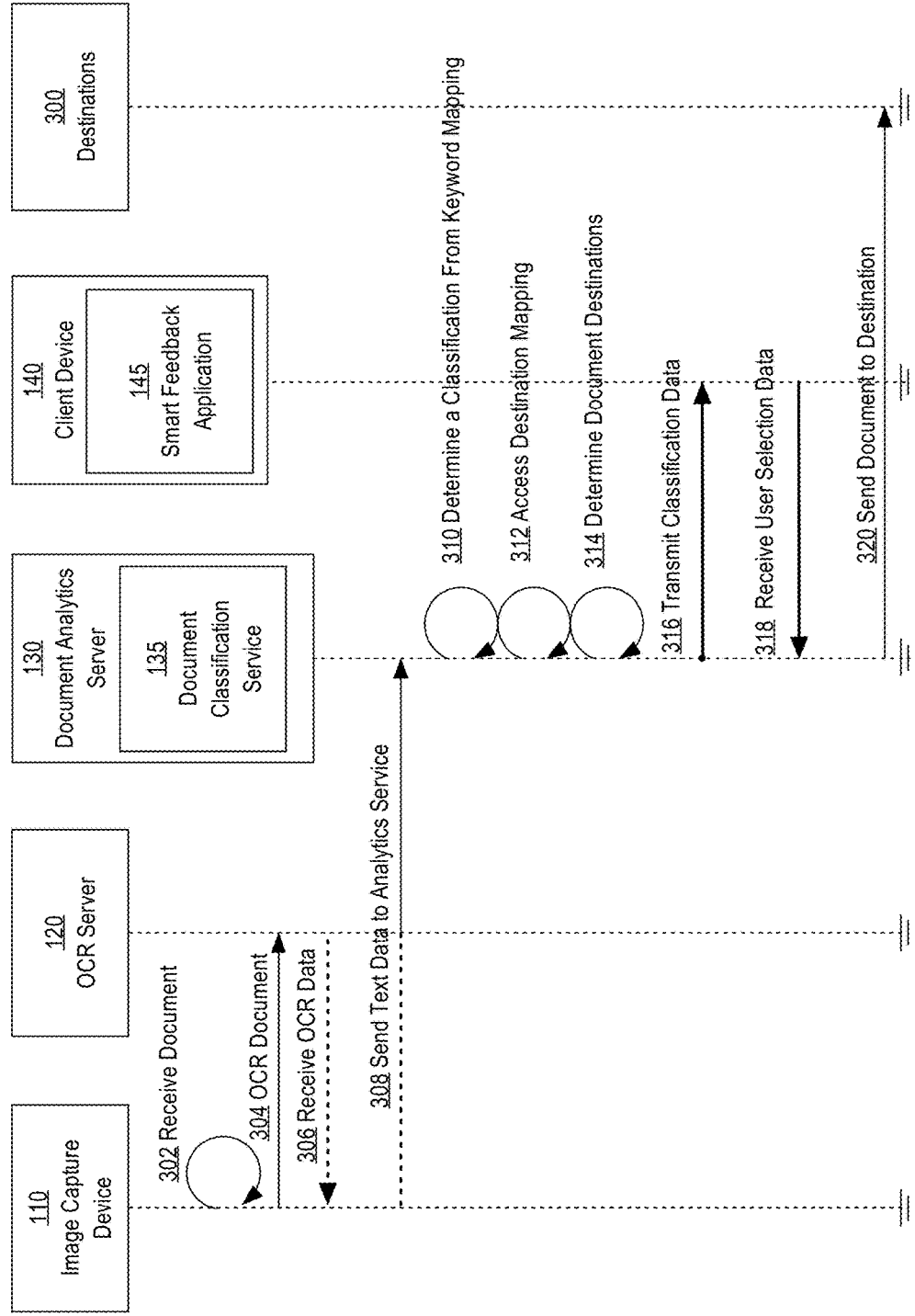
FIG. 3 is a block diagram that depicts an example method for routing documents according to an embodiment.

FIG. 3 is a block diagram that depicts an example method for notifying and routing documents based upon classification types according to an embodiment. FIG. 3 contains image capture device 110, OCR server 120, document classification service 135 implemented on document analytics server 130, smart feedback application 145 implemented on client device 140, and destinations 300. Destinations 300 may comprise destination devices 150 of FIG. 1, destination folders 220 of FIG. 2, or any combination thereof. The various systems of FIG. 3 may interact over a network as shown in FIG. 1 and FIG. 2.

At step 302, image capture device 110 receives a document. For example, image capture device may be a scanning device that receives a document through a digital scan. Image capture device 102 may also be a facsimile machine that receives image data over a network. Embodiments may also be implemented where image capture device 110 includes a device capable of capturing an image through photography, such as a camera on a mobile phone, tablet, or computing device, and where image capture device 110 receives documents through email.

At step 304, an OCR process is performed on the document. In an embodiment, image capture device 110 contains an OCR module capable of performing the OCR process. In alternate embodiments, the document is sent to OCR server 120 which contains an OCR module capable of performing the OCR process. The OCR module may be implemented using one or more computer programs or other software elements that are loaded into and executed using one or more general-purpose computers, logic implemented in field programmable gate arrays (FPGAs) of application-specific integrated circuits (ASICs).

At step 306, image capture device receives the OCR data from OCR server 120. In an embodiment, OCR server 120 is configured to receive documents from image capture device 110 and return the OCR data to image capture device 110. In alternative embodiments, OCR server 120 may also communicate with document analytics server 130. For example, OCR server 120 may be configured to receive client identification data from image capture device 110, along with the one or more documents, and forward the client identification data with the one or more documents and text data to document analytics server 130, thereby obviating the need to send the OCR data back to image capture device 110.

At step 308, OCR data is sent to an analytics service. For example, either image capture device 110 or OCR server 120 may send the OCR data to document analytics server 130. In an embodiment, additional data is sent to document analytics server 130, such as an identification of image capture device 110, identification of a user of image capture device 110, contact information for the user of image capture device 110, client identification information, and the original document.

While the method is discussed in terms of documents received as images, the routing methods described herein may be applied to text-based documents as well. For example, image capture device 110 may be a general purpose computing device that receives text-based documents over a network, such as through email. If the document is received as an image, an OCR process may be performed on the document to transform it into a text document. If the document is received as a text document, it may be sent to document analytics server 130 as a text document.

4. Document Analytics

The document analytics server 130 may be configured or programmed to receive OCR data over network 100 and perform document analytics functions on the OCR data. Document analytics function include, but are not limited to, determining a classification type for a document based upon one or more keywords and one or more rules describing keyword combinations and determining one or more routing destinations based upon the determined classification type of the document. In an embodiment, the document analytics server 130 implements a document classification service 135 that performs the document analytics functions. In other embodiments, services other than the document classification service 135 may be implemented by the document analytics server 130 to perform one or more parts of document analytics functions. For example, a database query service may be implemented by the document analytics server 130 to perform database queries related to classification type and routing destination mapping.

4.1. Classification Mapping

Referring to FIG. 3, at step 310 the document classification service 135 determines a classification for the document using the one or more keywords in the document and keyword-to-classification mapping. The document classification service 135 may implement or access keyword-to-classification mapping from a classification mapping database. The classification mapping database may include mapping between keyword combinations and classification types. In an embodiment, a keyword combination is a combined set of keywords and/or rules that describe a mapped combination. For instance, the rules within a keyword combination may describe different combinations of the set of keywords including, but not limited to, an ordered combination of specific keywords within the document, ranges of spacing between specific subsets of keywords, a minimal subset of keywords within the document, and an identified set of synonyms for the set of keywords. In an embodiment, classification type is defined as a label used to categorize documents. For example, classification type Medical Invoice is a label for categorizing all documents that are invoices for medical transactions and/or procedures. In an embodiment, the classification mapping database may include a classification table that maps the keyword combinations to the classification types.

In an embodiment, the classification table may include a keyword combination mapped to classification type Medical Invoice. The keyword combination may include a set of keywords: patient, provider, fee-for-service, contracted physician, payor, and payee. The keyword combination may also include rules that may specify, for example, that payor and payee need to be within three lines of each other. For example, if a document contained the following set of keywords in a combination specified by the rules then the document classification service 135 may determine from the keyword-to-classification mapping that the document matches "medical invoice" classification type.

In an embodiment, the document classification service 135 may implement a scoring system in order to determine which classification type matches the document. For instance, document A may contain the following set of keywords: fee-for-service, payor, payee, and provider. The classification table may contain the mapping for Medical Invoice and mapping for Contract, where contract maps to the set of keywords: fee-for-service, payor, payee, services, and rate. The document classification service 135 may determine that keyword combinations for document A may match both Medical Invoice and Contract types. In this scenario, the document classification service 135 may implement the scoring system where specific types of rules for specific combinations accumulate a score values for each identified classification type. For instance, document A may score higher for Medical Invoice than Contract, and therefore may match document A to the Medical Invoice.

In an embodiment, classification types within the classification table may be related to one another based upon a hierarchal classification structure. The hierarchal classification structure may include broad classification types that may have one or more narrow sub-classification types related to the broad classification types. For example, classification type Invoice may be a broad classification type that has related sub-classification types: Medical Invoice, Legal Invoice, Construction Invoice, and Engineering Invoice. For example, classification type Invoice may include keywords: provider, fee-for-service, payor, and payee. The related sub-classification types may include all keywords from Invoice and additional keywords that are specific to the sub-classification type. For instance, Medical Invoice may also include keywords "patient" and "contracted physician". Sub-classification type Legal Invoice may additionally include keywords "representing counsel" and "case number". Sub-classification type Construction Invoice may additionally include keywords "contractor" and "construction estimate".

In an embodiment, the document classification service 135 may utilize the hierarchal classification to classify certain documents at the broader classification type when it cannot be determined that a particular document belongs to one of the related sub-classification types. For example, if the keywords in document B include keywords such as "medical invoice", "physician", and "representing counsel", the document classification service 135 may classify the document as an Invoice type and allow the user to later change it to a more specific classification type.

4.2. Routing Determination

Electronic documents may be routed to different destinations based upon their classification type. In an embodiment, the classification mapping database contains one or more classification-to-destination routing database tables. A classification-to-destination routing table may contain mapping that maps a classification type to one or more defined destinations. For example, the classification-to-destination routing table may contain mapping information that maps classification type Medical Invoice to Computer A. In an embodiment, destinations may be defined as one or more destination folders stored on one or more computers.

Referring to FIG. 3, at step 312 the document classification service 135 accesses destination mapping data for the one or more classifications identified in step 310. In an embodiment, accessing destination mapping data includes processing one or more queries against the one or more classification-to-destination routing database tables. In another embodiment, classification mapping may be stored in any format that allows information to be retrieved based upon a classification type, such as, a relational database, object database, or any other storage repository.

At step 314, the document classification service 135 determines destinations for the documents based upon the determined classification types. In an embodiment, the document classification service 135 compiles classification data comprising identifiers for the documents classified, the classification types of the documents, and the routing destinations mapped to the classification types. For example, if the document classification service 135 determined that document A and document B should be classified as Medical Invoice and Legal Invoice respectively, then the classification data may include: identifiers such as doc-A and doc-B for document A and document B, classification types Medical Invoice and Legal Invoice, and the destination routings folders for the classification types Medical Invoice and Legal Invoice. The destination routing folders for Medical Invoice and Legal Invoice may be "Computer-A/invoice/medical/" and "Computer-A/invoice/legal/" respectively.

In an embodiment, the classification data may also include priority flags that may be used to differentiate different levels of priority for one or more documents based upon classification type. For example, different classification types may be associated with different levels of priority such as, Legal Invoice may be tagged as high priority, whereas Confirmation Notice may only receive normal priority. The different levels of priority may be implemented by either audio type notifications, physical type notifications, visuals type notifications, or a combination of one or more types.

4.3. Transmitting Classification Data

In an embodiment, the step of storing the documents at the determined routing destinations does not occur until a user has confirmed the correct classification for the documents. At step 316, the document classification service 135 transmits the classification data over network 100 to the smart feedback application 145 running on the client device 140. The purpose of transmitting classification data to the smart feedback application 145 is to allow a user of the of smart feedback application 145 to confirm or change the determined classification types for the documents before the documents are routed to their appropriate storage destination.

In an embodiment, the client device 140 is configured with the smart feedback application 145. The smart feedback application 145 is configured to receive notifications from the document classification service 135 and send back user selection data to the document classification service 135. User selection data is data inputted by a user of the smart feedback application 145 that either: confirms a classification type for a document, requests a change in classification type for the document, requests to delete the document from the document analytics server 130, or requests to train the document classification service 135 and update rules and/or combinations of keywords associated with classification types. Embodiments of the smart feedback application 145 features and types of user selection data are described in detail in the SMART FEEDBACK APPLICATION section herein.

5. Storing Electronic Documents

Referring back to FIG. 3, at step 318 the document classification service 135 receives user selection data from the smart feedback application 145. In an embodiment, the user selection data may contain a confirmation message for a particular document that confirms the classification type previously assigned to the particular document by the document classification service 135.

At step 320 in response to receiving the confirmation message, the document classification service 135 causes the particular document to be transmitted to the destination associated with the confirmed classification type. In an embodiment, the document classification service 135 accesses the classification mapping database to retrieve the destination routing from the classification-to-destination routing table. After retrieving the destination mapped to the classification type, the document classification service 135 sends the document to appropriate destinations 300, which may include storing the document at one or more locations.

For example, if the confirmation message from the smart feedback application 145 confirmed that document A is correctly classified as a Medical Invoice, then the document classification service 135 would access the classification-to-destination routing table to retrieve the destination assigned to classification type Medical Invoice, and then send the document to that particular destination. As stated in the previous medical invoice example, the Medical Invoice classification type maps to Computer A. After retrieving the destination routing, the document classification service 135 would send document A to Computer A, represented in FIG. 3 as destinations 300.

6. Smart Feedback Application

In an embodiment, the smart feedback application 145 is a document notification application implemented on the client device 140 and configured to display classification data for documents that are waiting to be routed according to their designated classification types. In addition to displaying the classification data, the smart feedback application 145 is configured to send user selection data back to the document classification service 135. User selection data includes user confirmations and/or user requests. A user confirmation is defined as input from the user that confirms the classification type assigned to a particular document. User requests are user input that specify either a manual change to the assigned classification type or destination folder of a document or the deletion of the document and its classification designation. In an embodiment user requests include, but are not limited to, user change requests, user delete requests, and user train requests.

In an embodiment, the smart feedback application 145 comprises multiple user screens configured to allow the user to login to the application, navigate to different pending documents, and send user selection data related to assigned classification types for the pending documents. FIG. 4A depicts a home screen for client device 140 including the smart feedback icon 402 that represents the smart feedback application 145. In an embodiment, notification bubble 404 represents a visual notification that shows pending documents for classification. Notification bubble 404 may be implemented using multiple notification methods for notifying the user of pending documents, including, but not limited to, different colored notification bubbles, notifications on the client device 140 lock screen, pop-up notifications on the client device 140 notification pane, audible beeps or other audible notifications, and notifications in the form of vibrations from the client device 140.

In an embodiment, the smart feedback application 145 may implement multiple types of notification methods based upon different priority levels associated with classification types in the classification data. For example, the smart feedback application 145 may implement notification methods for high priority classification types that include notifications on the client device lock screen, audible beeps, and/or vibrations from the client device 140 to alert the user of pending documents with high priority classification types.

Figure 4B:
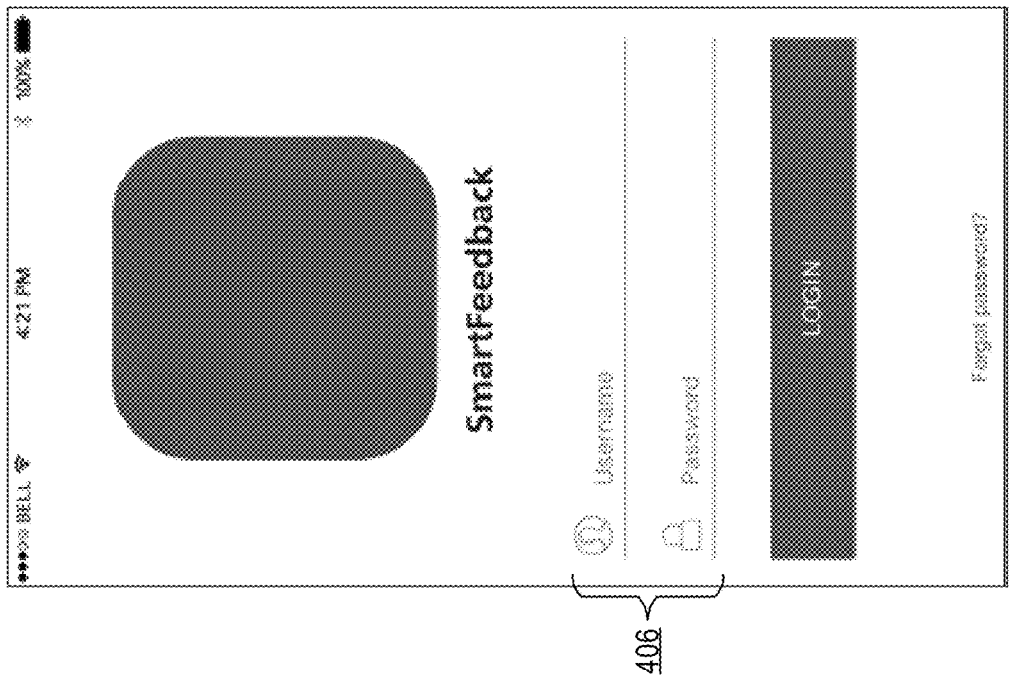
Figure 4A:
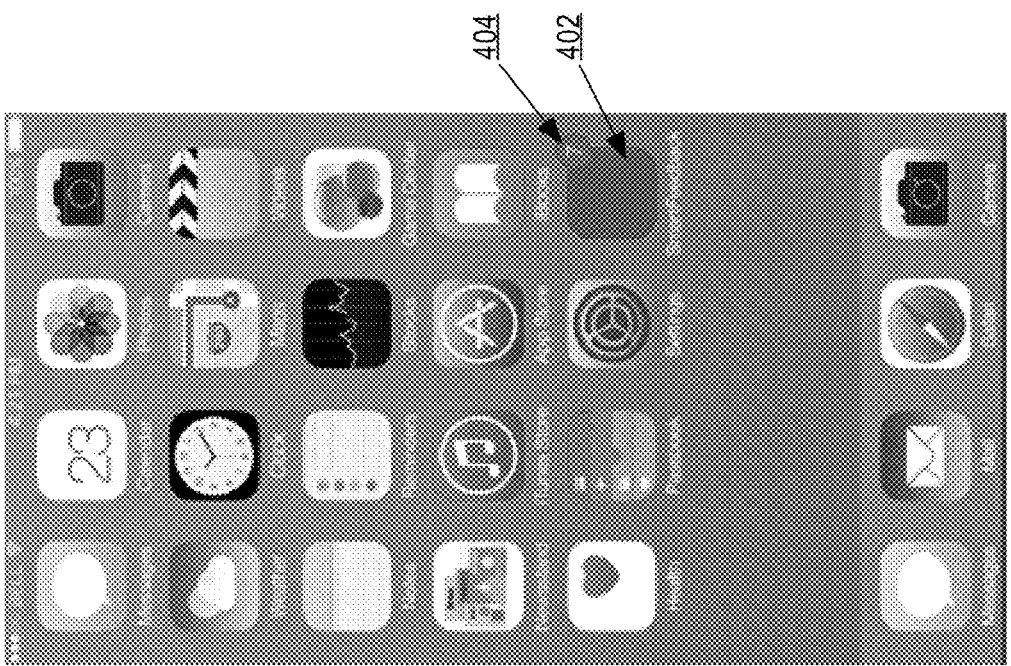

FIG. 4B depicts a sample user login screen for the smart feedback application 145. Login box 406 allows a user to enter user credentials, such as a username and password, for login purposes. In an embodiment, classification data for particular classified documents are associated with particular users. For instance, User A may only have privileges related to legal documents. After User A logs into the smart feedback application 145, User A only sees classification data for pending legal documents that User A has authority to confirm, change, or delete assigned classification types.

In an embodiment, multiple users may be grouped into specific user groups such that multiple users would receive the same notifications for a certain set of documents. For example, User A and User B may be part of "Legal Group 1". Referring back to step 316, the document classification service 135 may transmit classification data to client devices associated with users in Legal Group 1. By doing so, either User A or User B would have the ability to confirm, change, or delete assigned classification types related to the specific legal documents. Although embodiments are described herein in the context of particular types of groups, this is done for explanation purposes only, and embodiments are applicable to any type of logical group.

In an embodiment, pending documents may be displayed in a list format that includes the determined classification type, document name and/or document identifier, and a time stamp of when the classification type for the document was determined. FIG. 4C is an example of the pending documents display screen. In an embodiment, list 408 depicts the list of pending documents that require classification confirmation or other actions. List 408 may be implemented to use icons that represent different classification types. For example, classification type Invoice may be represented with a blue colored box with a bookmark icon. Other classification types, such as Form, may be represented with a yellow colored box with a clipboard icon. By using different configured icons and different colors the user is able to quickly recognize the classification type assigned by the document classification service 135. Other embodiments of list 408 may differentiate classification types by using different colored boxes, different icons, or colored shading of the entire row.

List 408 may be configured to display specific document details for each pending document. FIG. 4C shows classification name 410 displayed next to the classification type icon in list 408. Classification name 410 may be a user configured display name for each classification type, which also includes name for unclassified designations and error designations. Additionally timestamp 412 may be displayed for each pending document within list 408. In an embodiment, timestamp 412 may indicate the time at which the classification was determined. In another embodiment, timestamp 412 may indicate the time and date at which the document was scanned by the image capture device 110. In yet another embodiment, timestamp 412 may indicate the date and time at which the OCR server 120 performed OCR text recognition.

In an embodiment, document ID 414 may display the document file name or document identifier for the pending document. The document ID 414 may be derived from OCR data from the document or any other configured parameter used to identify the file. For example, document ID 414 references document file name "HR_Record2015.pdf". In an embodiment, the user of the smart feedback application 145 may configure display options of list 408 to either display more or less document and classification details as described.

In an alternative embodiment, list 408 may be comprised of items that represent different classification types. For example, list 408 may list the different classification types for the pending documents. Then when the user clicks on a specific classification type, the smart feedback application 145 displays another list of all pending documents of that particular classification type.

Figure 4D:
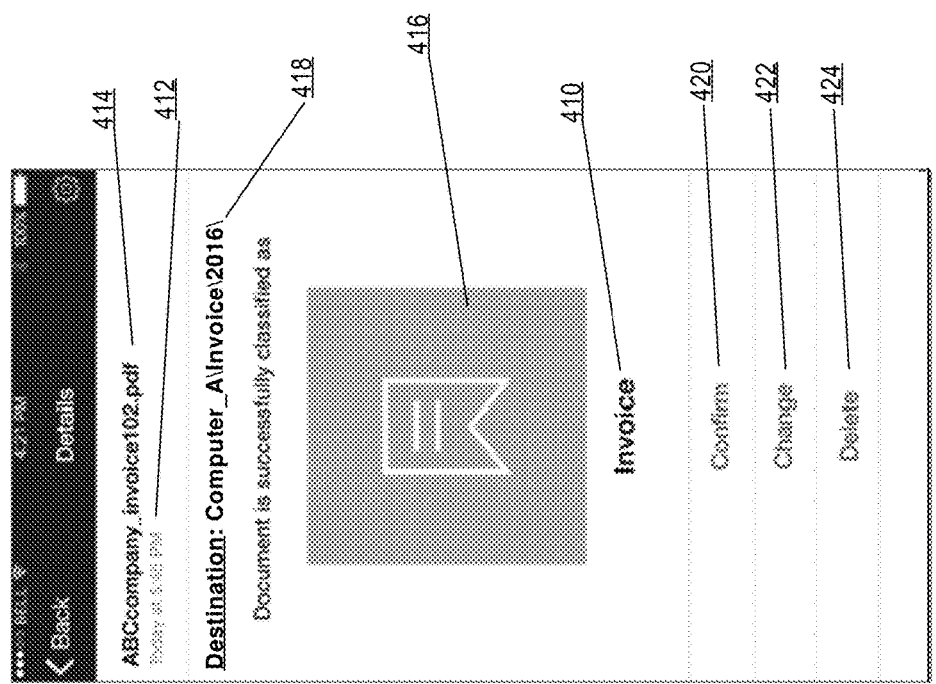

In an embodiment, when the user clicks on one of the pending documents in list 408, the smart feedback application 145 displays a document details screen, as depicted in FIG. 4D. The document details screen displays details of the pending document including, but not limited to, the document ID 414, the timestamp 412, the classification name 410, a classification icon 416, a destination folder 418, and available user options. The document details screen may be configured with available user options including, but not limited to, confirm, change, and delete.

6.1. User Confirmation

In an embodiment, the confirm button 420 allows the user to confirm the assigned classification type for the particular document. When the user selects the confirm button 420 the smart feedback application 145 sends user selection data that contains the user confirmation to the document classification service 135 via network 100. Contents of the user selection data may include details such as, an acknowledgement that confirms the classification type of the particular document, the document ID 414, and the classification type being confirmed. In another embodiment, user selection data may additionally include information about the user who confirmed the classification type. By sending user information within the user selection data, the document classification service 135 may be capable of keeping a log of which users confirmed which documents. In yet another embodiment, user selection data may be limited to only including an acknowledgement and the document ID for the purposes of limiting the size of user selection data.

Figure 4E:
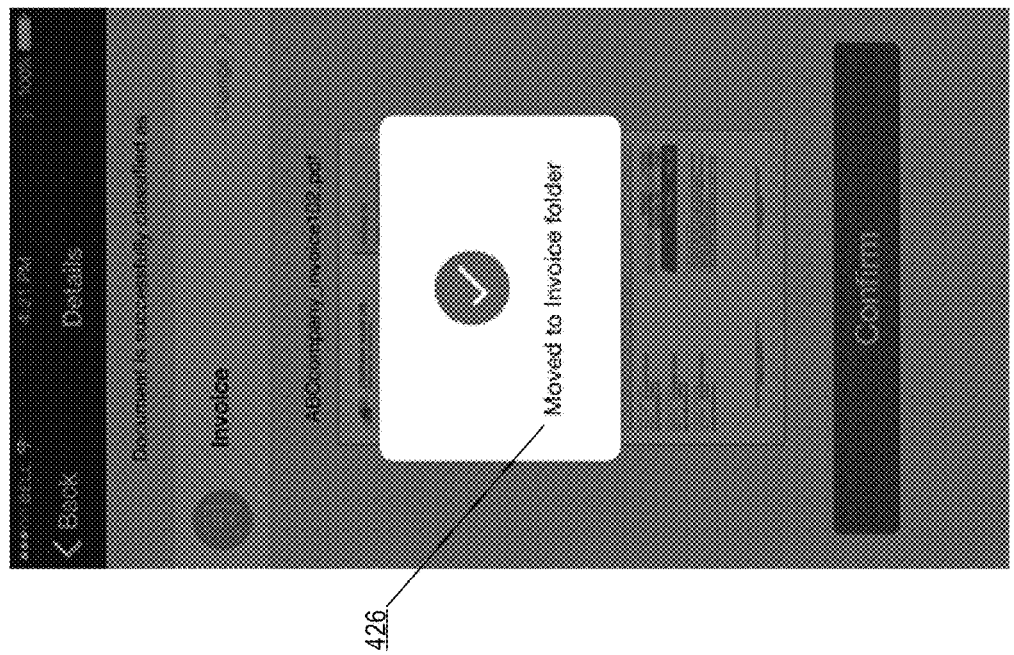

In an embodiment the smart feedback application 145 may notify the user that the user selection data, including the user confirmation, has been sent to the document classification service 135. FIG. 4E illustrates an embodiment of the smart feedback application 145 notifying the user that the user confirmation has been sent to the document classification service 135 and the particular document has been moved to the appropriate destination folder. In an embodiment, a sent notification 426 window may be displayed on the user screen to notify the user that the user selection data has been sent to the document classification service 135.

In an embodiment, user confirmation may include confirming a particular classification type of a document as well as specifying a particular destination folder for the document. If the particular classification type is a top level classification that has related sub-classifications or multiple destination folders, then the smart feedback application 145 may display a subset of destination folders from which the user may select where to route the document. For example, classification type Invoice may have multiple destination folders related to it, such as, Project_A, Project_B, Project_C, and Project_D. In this scenario, when the user selects the confirm button 420, the smart feedback application 145 may prompt the user to choose one of the destination folders from the subset of destination folders Project_A through Project_D. Once the user selects a destination folder from the subset of destination folders, the smart feedback application 145 sends the user selection data that contains the user confirmation, including the selected destination, folder to the document classification service 135.

In an embodiment, after the smart feedback application 145 has sent the user selection data to the document classification service 135, the smart feedback application 145 may display the pending documents display screen (FIG. 4C) so that the user may confirm, change, or delete a classification type for a second document in list 408. Steps for confirming a second document may include the same display screens and same options as confirming the previous document.

6.2. User Change Request

Referring back to the document details screen, as depicted in FIG. 4D, the user has the option of changing the classification and destination folder of a document that has been currently assigned to a particular classification type by the document classification service 135. In an embodiment, the change button 422 allows the user to change the classification type and the destination folder for the document. When the user selects the change button 422 the smart feedback application 145 presents the user with available classification types to be assigned to the document. In an embodiment when the user selects the change button 422, the smart feedback application 145 may request, from the document classification service 135, a set of available classification types that may be assigned to the document. In an alternative embodiment, the smart feedback application 145 may have already received the set of available classification types as part of the classification data previously sent by the document classification service 135 at step 316.

FIG. 4F illustrates an example screenshot of the set of available classification types displayed after the user selects the change button 422. The set of classification types may be presented to the user in the form of a hierarchal set of classification types. For instance, top level classifications 428 depicts the top level of classification types available. These classification types are the broadest classifications and may contain related sub-classifications. Available sub-classifications may be indicated by a sub-classification arrow 434.

In an embodiment, when the user selects a classification type that has the sub-classification arrow 434, the user may be presented with an additional sub-classification screen where the user may either select a sub-classification or choose to assign the previously selected classification type. For example, if the user selected classification type record 430, which has an associated sub-classification arrow 434, then the user would be presented with an additional sub-classification screen. FIG. 4G illustrates the additional sub-classification screen for classification type record 430. In FIG. 4G, classification type record 430 has been selected by the user, as shown by the selection arrow 438. Since classification type record 430 has been selected, the user may elect to assign that particular classification type to the document pressing the done button 432 at the bottom of the screen. When the user selects the done button 432, the smart feedback application 145 sends user selection data, which contains the user change request, to the document classification service 135 via network 100. Contents of the user change request may include the document ID 414, the newly selected classification type record 430, and optionally information identifying the user that is making the change request. In response, to receiving the user change request, the document classification service 135 may be configured to route the document to the destination associated with the newly selected classification type.

In another embodiment, the user may optionally continue to select classification types that have related sub-classifications. For example referring to FIG. 4G, the user may continue to traverse down the classification type hierarchy by selecting one of the sub-classifications of classification type record 430, labelled as record sub-classifications 436. If the user selects sub-classification contractor 440, which does not have an associated sub-classification arrow 434, then the user may trigger a user change request by pressing the done button 432 at the bottom of the screen. Alternatively, if the user selects sub-classification medical 442, which does have an associated sub-classification arrow 434, then the smart feedback application 145 may further present the user with another set of sub-classifications, as illustrated in FIG. 4H.

Figure 4H:
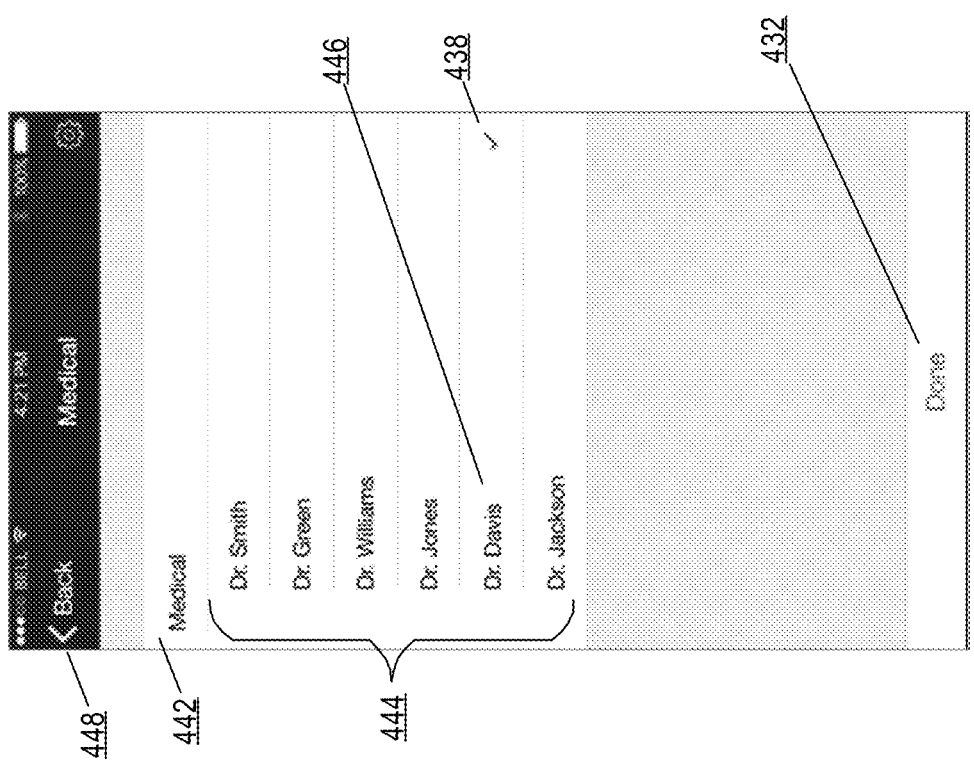

FIG. 4H illustrates an example set of sub-classifications for sub-classification medical 442, labelled as medical sub-classifications 444. Since the sub-classifications within medical sub-classifications 444 do have any associated sub-classification arrows, once the user selects a sub-classification from the medical sub-classifications 444, the user may trigger a user change request by pressing the done button 432. For example, if the user selected sub-classification Dr. Davis 446, then the smart feedback application 145 would indicate the selection using selection arrow 438.

The user then would trigger the user change request by pressing the done button 432. In this example, the user change request would include document ID 414 and the newly selected classification type Dr. Davis 446. In an embodiment, the user change request may additionally include the destination folder for Dr. Davis 446.

In another embodiment, in response to selecting the change button 422 on the document details screen (FIG. 4D); the smart feedback application 145 may present the user with a set of available destination folders.

Referring to FIG. 4F, the user may select a special classification type labelled "Unclassified" from the top level classifications 428 list. In an embodiment, upon selecting the "Unclassified" label, the smart feedback application 145 may send an unclassified options request to the document classification service 135. In an embodiment, the document classification service 135, in response to receiving an unclassified options request, may transmit classification data to the smart feedback application 145 that labels the document as unclassified, which may prompt the smart feedback application 145 to provide classification options for the newly unclassified document. Details of the unclassified options are discussed in the USER TRAINING REQUEST section herein.

6.3. User Delete Request

Referring back to the document details screen, as depicted in FIG. 4D, the user has the option of removing the pending document by pressing the delete button 424. In an embodiment, the delete button 424 causes the smart feedback application 145 to send a deletion request to the document classification service 135. The deletion request may delete the pending document and its assigned classification from the pending documents. By deleting a pending document, the document, including all OCR data, is deleted from the document analytics server 130.

In another embodiment, the delete button 424 may be configured to only delete the classification type assigned to the pending document. In this scenario, the smart feedback application 145 may send a user delete request to the document classification service 135 that only includes a request to remove the assigned classification type. This may result in the document classification service 135 assigning the unclassified label to the pending document.

6.4. User Training Request

In an embodiment, when the document classification service 135 is unable to determine a classification type for a document, the document classification service 135 may assign a special classification type called "unclassified" to the document. The unclassified type may be assigned when the document classification service 135 cannot determine with reasonable certainty a classification type from the available classification types based upon the keyword combinations. In another embodiment, if the keywords within the document result in the document classification service 135 determining multiple classification type possibilities, then the document classification service 135 may defer to the user to manually select the correct classification type by assigning the document the unclassified type.

Figure 4J:
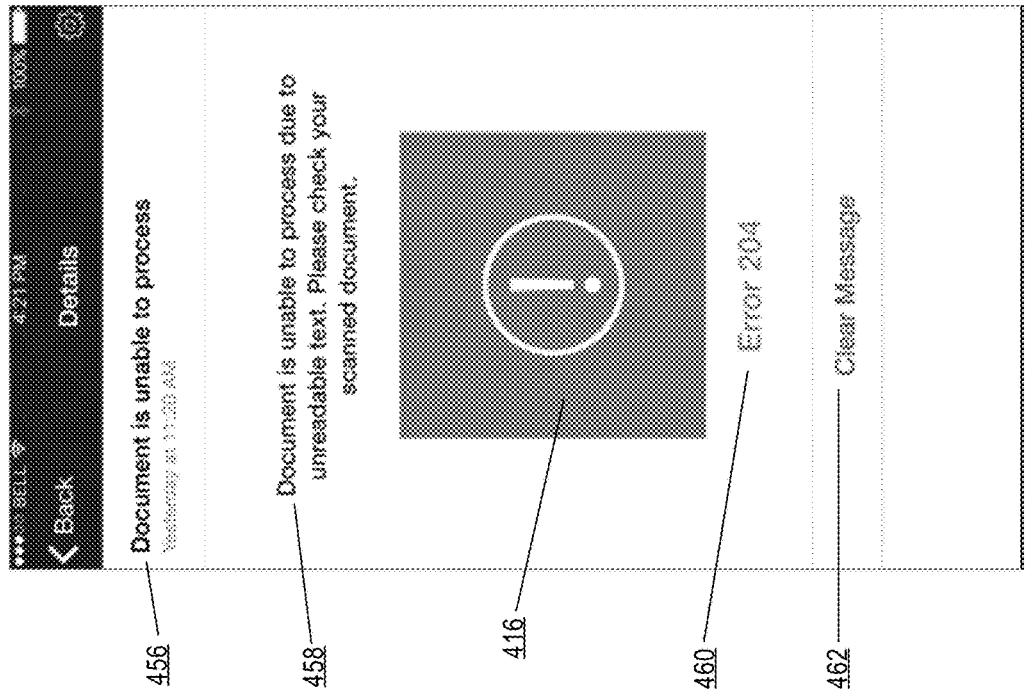
Figure 4I:
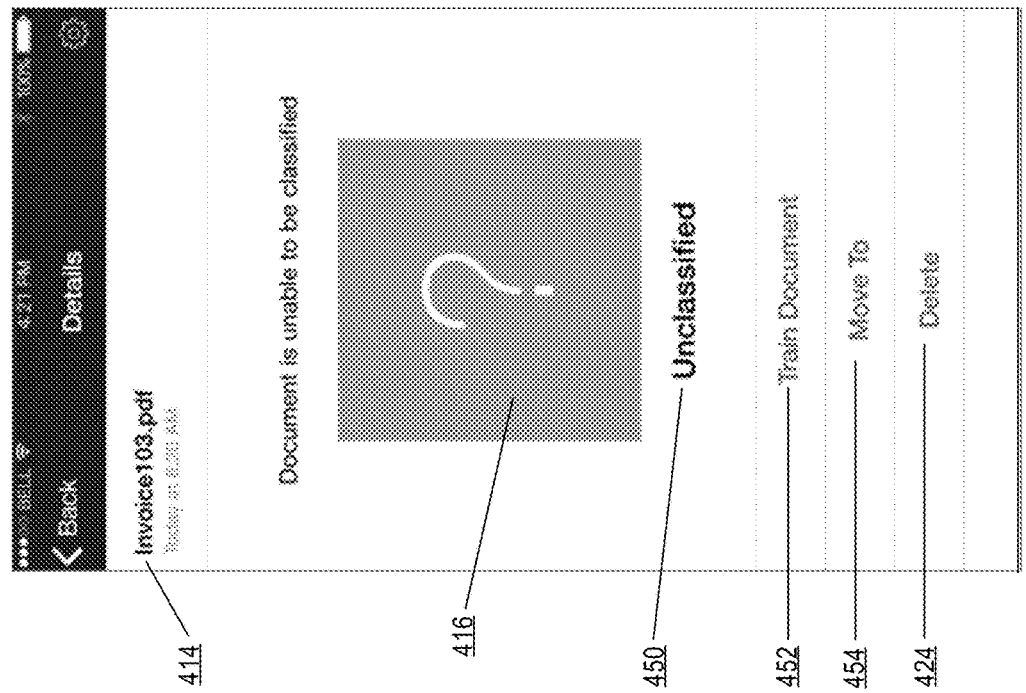

FIG. 4I illustrates an example screenshot of user options when viewing the document details screen of an unclassified document. In an embodiment, the document ID 414 is displayed and the top of the unclassified document screen. In this example the unclassified document is called Invoice103.pdf. In an embodiment, the document ID 414 may be based on one or more keywords identified during the OCR process. In an embodiment the classification name 410 and the classification icon 416 may be displayed in the center of the screen so the user is aware of the current classification type. In this case, the classification name 410 is represented as "Unclassified" and the classification icon 416 is represented as a large question mark so as to signify to the user that the document is unclassified. In an embodiment, the smart feedback application 145 may provide options to the user including, but not limited to, train document, move to, and delete.

In an embodiment, the train document option may include training the document classification service 135 by updating keyword combinations and rules associated with existing classification types in the classification mapping database. The user may trigger the train document option by pressing the train document button 452. When the user selects the train document button 452, the smart feedback application 145 may present the user with available classification types to assign to the unclassified document. When the user selects a classification type, for example Invoice, the smart feedback application 145 may send user selection data to the document classification service 135, which includes the document ID 414, the selected classification type Invoice, and a user training request.

In an embodiment, upon receiving the user selection data, which includes the user training request, the document classification service 135 may update the classification mapping database for the selected classification type with particular keywords from the unclassified document. For example, if the user training request was directed to updating the classification type Invoice, then the document classification service 135 may update the classification mapping database to include either additional keywords or additional rules based upon the identified keywords in the unclassified document.

In another embodiment, upon pressing the train document button 452 the user may be prompted to manually create a new classification type based upon identified keywords and available keyword combinations and rules. For example, the smart feedback application 145 may present the user with a list of possible keywords and available rules such that the user may manually create a new classification type and associate new rules to that classification type. Embodiments of manually selecting keywords and rules may include, but are not limited to, radio buttons, dropdown boxes and any other selection screen where the user may select multiple options in order to create rules based upon Boolean conditions and the available keywords.

In another embodiment, the smart feedback application 145 may trigger the document classification service 135 to implement machine learning to improve the document classification determination based upon user selections. Embodiments of machine learning techniques are discussed in detail in the MACHINE LEARNING section herein.

Referring back to FIG. 4I, the user has options to manually move the unclassified document or delete the unclassified document from the pending documents. In an embodiment, the move to button 454, when selected, allows the user to manually select a classification type or destination folder without updating how existing classification mapping is used by the document classification service 135. In an embodiment, the move to button 454 may implement techniques previously discussed in the USER CHANGE REQUEST section. In an embodiment deleting an unclassified document may be accomplished by pressing the delete button 424, as discussed in the USER DELETE REQUEST section.

6.5. Document Error

In an embodiment, the smart feedback application 145 may display a pending document as an "error", which may occur if the document classification service 135 was unable to perform document analytics on the pending document. In an embodiment, an error may occur if the OCR process was unable to identify any usable keywords. In this scenario, the document classification service 135 would be unable to perform document analytics because the pending document does not have any keywords to analyze.

FIG. 4J illustrates and example of a document details page where the pending document was flagged as an error. In an embodiment, error message 456 is a notification to the user that the pending document was unable to be processed by the document classification service 135. Error details 458 may be display a detailed message describing why the document scan resulted in an error. For example error details 458 states that the "Document is unable to process due to unreadable text. Please check your scanned document." In an embodiment, the classification icon 416 may be represented with an exclamation point so as to alert the user of the severity of the issue. Other embodiments, may implement higher priority indicators such as audible beeps or vibrations from the client device 140. In an embodiment, error code 460 may display a configured numerical designation for the type of error that occurred. By using the error code 460, the user may be able to quickly assess the type of error without having investigate further or read the more detailed error details 458.

In an embodiment, the document details page may present the user with a clear message button 462 that allows the user to clear the pending document from the list 408. This option may be useful if the user is aware of particular documents that produce the error and wishes to simply remove the message from the list 408.

7. Machine Learning

In an embodiment, document classification service 135 is configured or programmed with a machine learning tool that uses prior classifications and confirmations to increase the accuracy of classification determination. The machine learning tool may comprise digitally programmed logic that performs pattern matching and document analysis. For example, if a user continually selects the Invoice classification for certain documents that contain the keywords "invoice" and "claim," document classification service 135 may stop associating the Claim classification type when both keywords are found in a document. If a user later selects the Claim classification type for a document that contains both keywords, document classification service 135 may begin associating the Claim classification type again. The machine learning tool may also perform more complex analyses, such as matching document types, finding additional language in the documents that narrow the options, or comparing all documents classified to a single classification type for similarities.

Matching classification types may include comparing multiple documents to find a pattern in the locations of specific strings. For example, patient information forms that are filled out by a patient will always contain matching words in matching locations, such as "Personal Information," "Name," "Address," "Do You Have Any of the Following Allergies," etc. The machine learning tool may match determine that forms with matching patterns are frequently selected to be classified to the same classification type. For example, the machine learning tool may determine that documents with the pattern of a patient information form are always assigned to the Medical classification type. In some embodiments, the pattern recognition is used in a more complex manner, such as to determine one of multiple sub-classifications to assign a document. For example, if the patient information forms are frequently classified to both the general administrative classification type and a separate classification type which is dependent on the patient's name, document classification service 135 may select the general administrative classification type based on the pattern matching and a doctor specific administrative type based on the patient's name. As another example, the patient's name may be used to select a classification for the patient while the pattern matching may be used to select a sub-classification, such as Patient Information.

Finding additional language in the documents that narrow the options may include finding words that make it more likely that a document is classified as one type or less likely that a document is classified as another type. For example, document classification service 135 may determine that documents containing the phrase "social security number" are rarely classified as a scheduling type. Document classification service 135 may choose to not display an option for the scheduling type if "social security number" is found in the document, regardless of other keywords found in the document. Additionally, document classification service 135 may determine that documents with the phrase "Resident Dorian" are frequently classified to the type "John Dorian" and/or his supervisor "Dr. Perry Cox." If a keyword is found in a document that is mapped to a large number of doctors, document classification service 135 may use the phrase "Resident Dorian" to narrow the selection to the aforementioned classification types.

In an embodiment, the keyword combinations also contain rankings for the keywords. The rankings may be used to narrow down a group of selected classifications, to order the group of selected classifications, or to choose specific classifications from the group of selected classifications to which to classify the document. For example, the keyword "invoice" may be mapped with a higher ranking than the keyword "claim." If both keywords are found in the document, the word "invoice" would take priority. In some embodiments, the priority of "invoice" would mean that the document is automatically classified as classification type Invoice. In other embodiments, the priority of "invoice" would mean that the classification type Invoice would be placed higher on the list of selected classification types than the classification type Claim.

In some embodiments, the frequency of a keyword may be used to narrow down a group of selected classifications, to order the group of selected classifications, or to choose a specific classification from the group of selected classifications. For example, a document that contains the words "page" and "scene" may be classified as a Media Review classification type over other classification types, such as Books, if the word "scene" is identified a large number of times and the word "page" is identified only a few times.

Weightings may also be used to narrow down a group of selected classifications, to order the group of selected classifications, or to choose a specific classification from the group of selected classifications. Weightings may refer to the relative importance of a specific keyword. If only one instance of each keyword is found, the weightings may be indistinguishable from rankings. If multiple instances of each keyword are found, the weightings may be used to determine a ranking of destinations. For example, in the media review classification example, the word "scene" may have a relatively low weighting due to the fact that many forms of media refer to scenes. "Page," on the other hand, may have a relatively high weighting due to the fact that pages are rarely discussed in connection with forms of media other than books. Thus, a document may use the word "scene" more frequently than the word "page," but the weightings for the words may cause document classification service 135 to rank the Books classification type higher than the TV/Movies classifications type. Weightings may be used with, or without, machine learning.

8. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
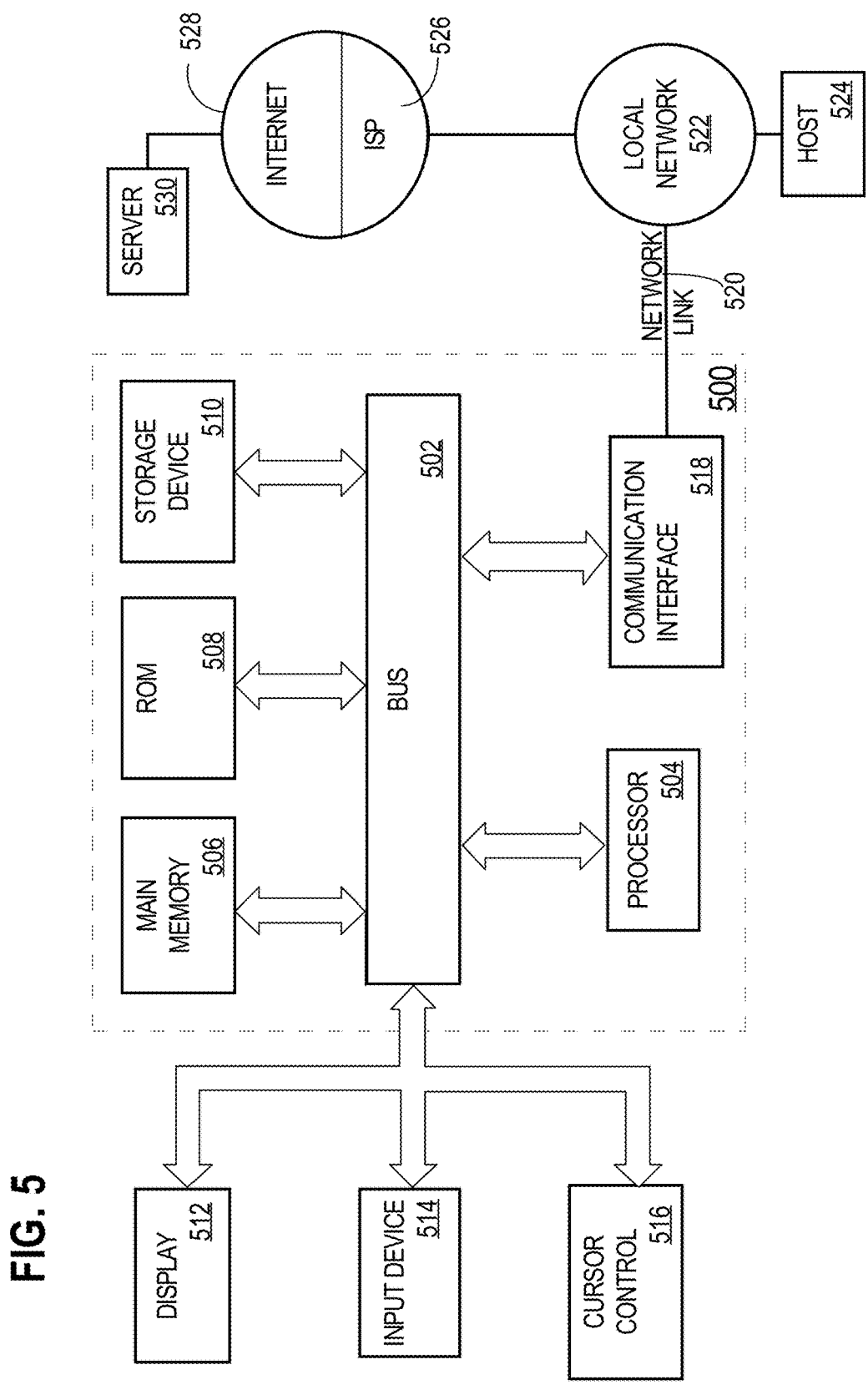
FIG. 5 is a block diagram that depicts an example computer system upon which embodiments may be implemented.

FIG. 5 is a block diagram that depicts an example computer system 500 upon which embodiments may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. Although bus 502 is illustrated as a single bus, bus 502 may comprise one or more buses. For example, bus 502 may include without limitation a control bus by which processor 504 controls other devices within computer system 500, an address bus by which processor 504 specifies memory locations of instructions for execution, or any other type of bus for transferring data or signals between components of computer system 500.

An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic or computer software which, in combination with the computer system, causes or programs computer system 500 to be a special-purpose machine. According to one embodiment, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments are not limited to any specific combination of hardware circuitry and software.

The term "computer-readable medium" as used herein refers to any medium that participates in providing data that causes a computer to operate in a specific manner. In an embodiment implemented using computer system 500, various computer-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, at a document analytics service, OCR data relating to two or more electronic documents, wherein at least two electronic documents of the two or more electronic documents are different electronic documents;
   determining, based upon the OCR data relating to the two or more electronic documents, two or more electronic document classifications for each electronic document from the two or more electronic documents, wherein at least two document classifications of the two or more electronic document classifications are different classifications;
   accessing destination mapping data that maps electronic document classifications to destinations;
   determining two or more destinations for the two or more electronic documents based, at least in part, on the two or more electronic document classifications for the two or more electronic documents and the destination mapping data that maps electronic document classifications to destinations;
   causing to be transmitted, over one or more networks to a client device, classification data that specifies the two or more electronic document classifications for each electronic document from the two or more electronic documents and document identification data that identifies the two or more electronic documents;
   receiving, from the client device over the one or more networks, user selection data for a first electronic document from the two or more electronic documents, wherein the user selection data for the first electronic document specifies a first user confirmation for a particular electronic document classification, from the two or more electronic document classifications, for the first electronic document; and
   in response to receiving the user selection data for the first electronic document that specifies the first user confirmation for a particular electronic document classification, from the two or more electronic document classifications, for the first electronic document, causing the first electronic document to be stored at the destination that corresponds to the particular electronic document classification.

2. The method of claim 1, further comprising:
   receiving, from the client device over the one or more networks, second user selection data for a second electronic document from the two or more electronic documents, wherein the second user selection data specifies a second user confirmation for a second particular electronic document classification, from the two or more electronic document classifications, for the second electronic document; and
   in response to receiving the second user selection data for the second electronic document that specifies the second user confirmation for a second particular electronic document classification, from the two or more electronic document classifications, for the second electronic document causing the second electronic document to be stored at the destination that corresponds to the second particular electronic document classification.

3. The method of claim 1, further comprising:
   receiving, from the client device over the one or more networks, second user selection data for a second electronic document from the two or more electronic documents, wherein the second user selection data specifies a user change classification request for the second electronic document;
   in response to receiving the second user selection data for the second electronic document that specifies the user change classification request for the second electronic document causing to be transmitted, over the one or more networks to the client device, a plurality of available classifications, to be displayed on the client device, for the second electronic document;
   receiving, from the client device over the one or more networks, third user selection data for the second electronic document that specifies a second user confirmation for a second particular electronic document classification, from the plurality of available classifications, for the second electronic document; and
   in response to receiving the third user selection data for the second electronic document that specifies a second user confirmation for a second particular electronic document classification, from the plurality of available classifications, for the second electronic document causing the second electronic document to be stored at the destination that corresponds to the second particular electronic document classification.

4. The method of claim 1, further comprising:
   receiving, from the client device over the one or more networks, second user selection data for a second electronic document from the two or more electronic documents, wherein the second user selection data specifies a user delete request for the second electronic document; and
   in response to receiving the second user selection data for the second electronic document that specifies the user delete request for the second electronic document causing the second electronic document and the OCR data related to the second electronic document to be deleted from the document analytics service.

5. The method of claim 1, further comprising:
   receiving, from the client device over the one or more networks, second user selection data for a second electronic document that specifies an unclassified options request for the second electronic document, wherein the second electronic document has been classified as type unclassified; and in response to receiving the second user selection data for the second electronic document that specifies the unclassified options request for the second electronic document, causing to be transmitted, over the one or more networks to the client device, a plurality of available user options, to be displayed on the client device, for the second electronic document, wherein the plurality of available user options includes at least: manually setting a classification for the second electronic document, deleting the second electronic document and the OCR data related to the second electronic document from the document analytics service, or updating the destination mapping data to include mapping that maps a selected electronic document classification to a particular destination for the second electronic document.

6. The method of claim 5, further comprising:

receiving, from the client device over the one or more networks, third user selection data for the second electronic document that specifies a user training request to update the document classifications based upon the selected electronic document classification and the second electronic document; and in response to receiving the user training request to update the document classifications based upon the selected electronic document classification and the second electronic document causing generation of classification data that maps the selected electronic document classification to the second electronic document and storage of the second electronic document at the destination that corresponds to the selected electronic document classification.

7. The method of claim 1, wherein causing to be transmitted, over one or more networks to a client device, classification data that specifies the two or more electronic document classifications for each electronic document from the two or more electronic documents and document identification data that identifies the two or more electronic documents further comprises:

transmitting, over one or more networks to a client device, priority data that specifies priority levels for the two or more electronic document classifications for the two or more electronic documents, wherein the priority data causes an indication of priority on the client device conveyed as at least one of: a visual indication of priority for the for the two or more electronic document classifications for the two or more electronic documents, an audio indication of priority for the for the two or more electronic document classifications for the two or more electronic documents, or a physical vibration of the client device to indicate priority for the for the two or more electronic document classifications for the two or more electronic documents.

8. One or more non-transitory computer readable media storing instructions, which when processed by one or more processors, cause:

receiving, at a document analytics service, OCR data relating to two or more electronic documents, wherein at least two electronic documents of the two or more electronic documents are different electronic documents;

determining, based upon the OCR data relating to the two or more electronic documents, two or more electronic document classifications for each electronic document from the two or more electronic documents, wherein at least two document classifications of the two or more electronic document classifications are different classifications;

accessing destination mapping data that maps electronic document classifications to destinations;

determining two or more destinations for the two or more electronic documents based, at least in part, on the two or more electronic document classifications for the two or more electronic documents and the destination mapping data that maps electronic document classifications to destinations;

causing to be transmitted, over one or more networks to a client device, classification data that specifies the two or more electronic document classifications for each electronic document from the two or more electronic documents and document identification data that identifies the two or more electronic documents;

receiving, from the client device over the one or more networks, user selection data for a first electronic document from the two or more electronic documents, wherein the user selection data for the first electronic document specifies a first user confirmation for a particular electronic document classification, from the two or more electronic document classifications, for the first electronic document; and in response to receiving the user selection data for the first electronic document that specifies the first user confirmation for a particular electronic document classification, from the two or more electronic document classifications, for the first electronic document, causing the first electronic document to be stored at the destination that corresponds to the particular electronic document classification.

9. The one or more non-transitory computer readable media of claim 8, further comprising additional instructions which, when processed by the one or more processors, cause:

receiving, from the client device over the one or more networks, second user selection data for a second electronic document from the two or more electronic documents, wherein the second user selection data specifies a second user confirmation for a second particular electronic document classification, from the two or more electronic document classifications, for the second electronic document; and in response to receiving the second user selection data for the second electronic document that specifies the second user confirmation for a second particular electronic document classification, from the two or more electronic document classifications, for the second electronic document, causing the second electronic document to be stored at the destination that corresponds to the second particular electronic document classification.

10. The one or more non-transitory computer readable media of claim 8, further comprising additional instructions which, when processed by the one or more processors, cause:

receiving, from the client device over the one or more networks, second user selection data for a second electronic document from the two or more electronic documents, wherein the second user selection data specifies a user change classification request for the second electronic document;

in response to receiving the second user selection data for the second electronic document that specifies the user change classification request for the second electronic document causing to be transmitted, over the one or more networks to the client device, a plurality of available classifications, to be displayed on the client device, for the second electronic document;

receiving, from the client device over the one or more networks, third user selection data for the second electronic document that specifies a second user confirmation for a second particular electronic document classification, from the plurality of available classifications, for the second electronic document; and in response to receiving the third user selection data for the second electronic document that specifies a second user confirmation for a second particular electronic document classification, from the plurality of available classifications, for the second electronic document causing the second electronic document to be stored at the destination that corresponds to the second particular electronic document classification.

11. The one or more non-transitory computer readable media of claim 8, further comprising additional instructions which, when processed by the one or more processors, cause:

receiving, from the client device over the one or more networks, second user selection data for a second electronic document from the two or more electronic documents, wherein the second user selection data specifies a user delete request for the second electronic document; and in response to receiving the second user selection data for the second electronic document that specifies the user delete request for the second electronic document causing the second electronic document and the OCR data related to the second electronic document to be deleted from the document analytics service.

12. The one or more non-transitory computer readable media of claim 8, further comprising additional instructions which, when processed by the one or more processors, cause:

receiving, from the client device over the one or more networks, second user selection data for a second electronic document that specifies an unclassified options request for the second electronic document, wherein the second electronic document has been classified as type unclassified; and in response to receiving the second user selection data for the second electronic document that specifies the unclassified options request for the second electronic document, causing to be transmitted, over the one or more networks to the client device, a plurality of available user options, to be displayed on the client device, for the second electronic document, wherein the plurality of available user options includes at least: manually setting a classification for the second electronic document, deleting the second electronic document and the OCR data related to the second electronic document from the document analytics service, or updating the destination mapping data to include mapping that maps a selected electronic document classification to a particular destination for the second electronic document.

13. The one or more non-transitory computer readable media of claim 12, further comprising additional instructions which, when processed by the one or more processors, cause:

receiving, from the client device over the one or more networks, third user selection data for the second electronic document that specifies a user training request to update the document classifications based upon the selected electronic document classification and the second electronic document; and in response to receiving the user training request to update the document classifications based upon the selected electronic document classification and the second electronic document, causing generation of classification data that maps the selected electronic document classification to the second electronic document and storage of the second electronic document at the destination that corresponds to the selected electronic document classification.

14. The one or more non-transitory computer readable media of claim 8, wherein causing to be transmitted, over one or more networks to a client device, classification data that specifies the two or more electronic document classifications for each electronic document from the two or more electronic documents and document identification data that identifies the two or more electronic documents further comprises:

transmitting, over one or more networks to a client device, priority data that specifies priority levels for the two or more electronic document classifications for the two or more electronic documents, wherein the priority data causes an indication of priority on the client device conveyed as at least one of: a visual indication of priority for the for the two or more electronic document classifications for the two or more electronic documents, an audio indication of priority for the for the two or more electronic document classifications for the two or more electronic documents, or a physical vibration of the client device to indicate priority for the for the two or more electronic document classifications for the two or more electronic documents.

15. An apparatus comprising:

one or more processors; and one or more memories storing instructions which, when processed by one or more processors, cause:

a document analytics service receiving OCR data relating to two or more electronic documents, wherein at least two electronic documents of the two or more electronic documents are different electronic documents;

the document analytics service determining, based upon the OCR data relating to the two or more electronic documents, two or more electronic document classifications for each electronic document from the two or more electronic documents, wherein at least two document classifications of the two or more electronic document classifications are different classifications;

the document analytics service accessing destination mapping data that maps electronic document classifications to destinations;

the document analytics service determining two or more destinations for the two or more electronic documents based, at least in part, on the two or more electronic document classifications for the two or more electronic documents and the destination mapping data that maps electronic document classifications to destinations;

the document analytics service causing to be transmitted, over one or more networks to a client device, classification data that specifies the two or more electronic document classifications for each electronic document from the two or more electronic documents and document identification data that identifies the two or more electronic documents;

the document analytics service receiving, from the client device over the one or more networks, user selection data for a first electronic document from the two or more electronic documents, wherein the user selection data for the first electronic document specifies a first user confirmation for a particular electronic document classification, from the two or more electronic document classifications, for the first electronic document; and in response to receiving the user selection data for the first electronic document that specifies the first user confirmation for a particular electronic document classification, from the two or more electronic document classifications, for the first electronic document, the document analytics service causing the first electronic document to be stored at the destination that corresponds to the particular electronic document classification.

16. The apparatus of claim 15, wherein the instructions include additional instructions which, when processed by the one or more processors, cause:

the document analytics service receiving, from the client device over the one or more networks, second user selection data for a second electronic document from the two or more electronic documents, wherein the second user selection data specifies a second user confirmation for a second particular electronic document classification, from the two or more electronic document classifications, for the second electronic document; and in response to receiving the second user selection data for the second electronic document that specifies the second user confirmation for a second particular electronic document classification, from the two or more electronic document classifications, for the second electronic document the document analytics service causing the second electronic document to be stored at the destination that corresponds to the second particular electronic document classification.

17. The apparatus of claim 15, wherein the instructions include additional instructions which, when processed by the one or more processors, cause:

the document analytics service receiving from the client device over the one or more networks, second user selection data for a second electronic document from the two or more electronic documents, wherein the second user selection data specifies a user change classification request for the second electronic document;

in response to receiving the second user selection data for the second electronic document that specifies the user change classification request for the second electronic document, the document analytics service causing to be transmitted, over the one or more networks to the client device, a plurality of available classifications, to be displayed on the client device, for the second electronic document;

the document analytics service receiving from the client device over the one or more networks, third user selection data for the second electronic document that specifies a second user confirmation for a second particular electronic document classification, from the plurality of available classifications, for the second electronic document; and in response to receiving the third user selection data for the second electronic document that specifies a second user confirmation for a second particular electronic document classification, from the plurality of available classifications, for the second electronic document, the document analytics service causing the second electronic document to be stored at the destination that corresponds to the second particular electronic document classification.

18. The apparatus of claim 15, wherein the instructions include additional instructions which, when processed by the one or more processors, cause:

the document analytics service receiving, from the client device over the one or more networks, second user selection data for a second electronic document from the two or more electronic documents, wherein the second user selection data specifies a user delete request for the second electronic document; and in response to receiving the second user selection data for the second electronic document that specifies the user delete request for the second electronic document, the document analytics service causing the second electronic document and the OCR data related to the second electronic document to be deleted from the document analytics service.

19. The apparatus of claim 15, wherein the instructions include additional instructions which, when processed by the one or more processors, cause:

the document analytics service receiving from the client device over the one or more networks, second user selection data for a second electronic document that specifies an unclassified options request for the second electronic document, wherein the second electronic document has been classified as type unclassified; and in response to receiving the second user selection data for the second electronic document that specifies the unclassified options request for the second electronic document, the document analytics service causing to be transmitted, over the one or more networks to the client device, a plurality of available user options, to be displayed on the client device, for the second electronic document, wherein the plurality of available user options includes at least: manually setting a classification for the second electronic document, deleting the second electronic document and the OCR data related to the second electronic document from the document analytics service, or updating the destination mapping data to include mapping that maps a selected electronic document classification to a particular destination for the second electronic document.

20. The apparatus of claim 19, wherein the instructions include additional instructions which, when processed by the one or more processors, cause:

the document analytics service receiving from the client device over the one or more networks, third user selection data for the second electronic document that specifies a user training request to update the document classifications based upon the selected electronic document classification and the second electronic document; and in response to receiving the user training request to update the document classifications based upon the selected electronic document classification and the second electronic document, the document analytics service causing generation of classification data that maps the selected electronic document classification to the second electronic document and storage of the second electronic document at the destination that corresponds to the selected electronic document classification.

\* \* \* \* \*